US012203861B2

(12) United States Patent
Misawa et al.

(10) Patent No.: US 12,203,861 B2
(45) Date of Patent: Jan. 21, 2025

(54) LIGHT DETECTION DEVICE AND LIGHT DETECTION METHOD

(71) Applicant: National University Corporation Tokyo University of Agriculture and Technology, Tokyo (JP)

(72) Inventors: Kazuhiko Misawa, Fuchu (JP); Terumasa Ito, Fuchu (JP)

(73) Assignee: NATIONAL UNIVERSITY CORPORATION TOKYO UNIVERSITY OF AGRICULTURE AND TECHNOLOGY, Tokyo (JP)

( * ) Notice: Subject to any disclaimer, the term of this patent is extended or adjusted under 35 U.S.C. 154(b) by 218 days.

(21) Appl. No.: 17/791,043

(22) PCT Filed: Dec. 24, 2020

(86) PCT No.: PCT/JP2020/048526
§ 371 (c)(1),
(2) Date: Jul. 6, 2022

(87) PCT Pub. No.: WO2021/140943
PCT Pub. Date: Jul. 15, 2021

(65) Prior Publication Data
US 2023/0026894 A1 Jan. 26, 2023

(30) Foreign Application Priority Data

Jan. 9, 2020 (JP) .................................. 2020-002107

(51) Int. Cl.
*G01N 21/65* (2006.01)

(52) U.S. Cl.
CPC ....... *G01N 21/65* (2013.01); *G01N 2021/655* (2013.01)

(58) Field of Classification Search
CPC .................... G01N 2021/655; G01N 21/65
See application file for complete search history.

(56) References Cited

U.S. PATENT DOCUMENTS

2010/0046039 A1  2/2010  Xie et al.
2021/0218215 A1  7/2021  Misawa et al.

FOREIGN PATENT DOCUMENTS

EP  2762859 A1  8/2014
JP  2010-048805 A  3/2010
WO  2019/220863 A1  11/2019

OTHER PUBLICATIONS

Terumasa Ito, "Single-beam phase-modulated stimulated Raman scattering microscopy with spectrally focused detection", Apr. 3, 2017 (Year: 2017).*
Marco Andreana, "Amplitude and polarization modulated hyperspectral Stimulated Raman Scattering Microscopy", 2015 Optical Society of America (Year: 2015).*

(Continued)

*Primary Examiner* — Maurice C Smith
(74) *Attorney, Agent, or Firm* — Morgan, Lewis & Bockius LLP

(57) ABSTRACT

Provided is a light detection device having a laser light source, a splitting unit, a first modulation unit, a second modulation unit, a first detection unit and a second detection unit that detect light, and a control unit.

14 Claims, 8 Drawing Sheets

(56) References Cited

OTHER PUBLICATIONS

International Search Report issued in corresponding International Patent Application No. PCT/JP2020/048526 dated Mar. 23, 2021.
Ito et al., "Invited Article: Spectral focusing with asymmetric pulses for high-contrast pump-probe stimulated Raman scattering microscopy," APL Photonics, 3 (9): 092405 (2018).
Extended European Search Report issued in corresponding European Patent Application No. 20912604.4 dated Apr. 25, 2023.

* cited by examiner

FIG.3

| ITEM | AM-SRS MODE | PM-SRS MODE | CONFOCAL MODE |
|---|---|---|---|
| EXCITATION BEAM (Le) | OFF | ON | OFF |
| FIRST PROBE BEAM (L1) | ON | ON | ON |
| SECOND PROBE BEAM (L2) | ON | ON | OFF |
| RF MODULATION | AMPLITUDE MODULATION (SINE WAVE) | PHASE MODULATION (SAWTOOTH WAVE) | AMPLITUDE MODULATION (SINE WAVE) |
| LIGHT SUBJECTED TO MODULATION | FIRST PROBE BEAM | SECOND PROBE BEAM | FIRST PROBE BEAM |
| DETECTION METHOD | TRANSMISSIVE (OR REFLECTIVE) | TRANSMISSIVE (OR REFLECTIVE) | REFLECTIVE |
| DETECTED LIGHT | SECOND PROBE BEAM (FIRST PROBE BEAM IS OUT) | FIRST PROBE BEAM (EXCITATION BEAM AND SECOND PROBE BEAM ARE OUT) | FIRST PROBE BEAM |
| INFORMATION | CHEMICAL INFORMATION (CONCENTRATION MAP) | CHEMICAL INFORMATION (CONCENTRATION MAP IN WHICH BACKGROUND NOISE IS SUPPRESSED) | MORPHOLOGY INFORMATION BASED ON LIGHT SCATTERING |

LIGHT DETECTION DEVICE AND LIGHT DETECTION METHOD

TECHNICAL FIELD

The present disclosure relates to a light detection device and a light detection method that detect Raman scattering.

BACKGROUND ART

Coherent Raman scattering microscopes are known as light detection devices that detect Raman scattering. Coherent Raman scattering microscopes are devices that apply two or more pulsed laser beams to a sample and observe Raman scattered light resultantly emitted from the sample to thereby analyze substances in the sample. This kind of technology is usually called Raman spectroscopy technology, and detecting trace substances with Raman spectroscopy technology holds great importance as a basic technology in spectrometers, with much technological development having been conducted. Meanwhile, together with recent advances in medical technologies, attempts are being made to apply trace substance detection technologies to medical diagnostic technologies, and in the field of medical diagnostic technologies also, further improvements in trace substance detection sensitivity are in demand.

Conventionally, coherent Raman scattering microscopes are usually amplitude-modulated coherent Raman scattering microscopes, which modulate the amplitude of an incident laser beam used for observation, make the incident beam incident on a sample, use a photodetector to detect light that has been transmitted or light that has been reflected and scattered with respect to the incident beam, and demodulate the light to detect a Raman signal.

As prior art relating to an amplitude-modulated coherent Raman scattering microscope, the microscopy imaging system disclosed in JP-A No. 2010-048805, for example, is known. The microscopy imaging system pertaining to JP-A No. 2010-048805 is a light detection device using stimulated Raman scattering (SRS), which is known as a coherent Raman effect. The microscopy imaging system 10 pertaining to JP-A No. 2010-048805 uses two trains of laser pulses, a train of laser pulses 20 at a center frequency $\omega_1$ used as a pump (excitation) beam and a train of laser pulses 16 at a center frequency $\omega_2$ used as a Stokes beam. The amplitude of the Stokes beam is modulated by a modulator, and the excitation beam and the Stokes beam are combined at a combiner 25 and then applied to a sample 22. Transmitted light transmitted through the sample 22 is sent to an optical detector 36, and by detecting the amplitude modulated component from a detection signal from the optical detector 36, an image based on stimulated Raman scattering is acquired.

In contrast to this, there is also the concept called phase-modulated coherent Raman scattering microscopes, which use phase modulation as means to detect stimulated Raman scattering. FIG. 8 shows a light detection device 100 pertaining to a comparative example configured as a phase-modulated coherent Raman scattering microscope. As shown in FIG. 8, the light detection device 100 is configured to include a light source 111, a pulse beam generation unit 150, and a microscope 125.

The light source 111 is a laser light source that generates an excitation beam and probe beams for generating a signal (SRS signal) based on the SRS process. In the light detection device 100, a pulsed excitation beam (excitation pulse beam) and probe beams (probe pulse beams) are used, and the light source 111 generates a light source pulse beam Ps that becomes the source of these pulse beams. In the light detection device 100, a femtosecond pulse is used as the light source pulse beam Ps. Furthermore, in the light detection device 100, two probe beams, a reference probe beam Lr and a phase modulated probe beam Lp are used as probe beams in addition to an excitation beam Le. The microscope 125 applies the excitation beam Le and the probe beams Lr, Lp to a sample, and a light receiving unit and a control unit (which are not shown in the drawings) are connected downstream.

In the light detection device 100, the output of the light source 111 is divided into three beams, the excitation beam Le, the phase modulated probe beam Lp, and the reference probe beam Lr, and the temporal relationship between an excitation pulse beam Pe, a phase modulated probe pulse beam Pp, and a reference probe pulse beam Pr is set as shown in FIG. 8. That is, the excitation pulse beam Pe is made incident temporally first, and after that the phase modulated probe pulse beam Pp and the reference probe pulse beam Pr, which are temporally coincident, are made incident. Then, the relative phase between the phase modulated probe pulse beam Pp and the reference probe pulse beam Pr is modulated, and the modulation in light intensity caused by interference between the resultantly produced Raman signal light and the reference probe pulse beam Pr is detected with an optical detector and is demodulated.

More specifically, the pulse beam generation unit 150 uses the light source pulse beam Ps to generate the excitation pulse beam Pe and two probe pulse beams, that is, the reference probe pulse beam Pr and the phase modulated probe pulse beam Pp. For that reason, the laser beam from the light source 111 is divided into three beams, the excitation beam Le, the reference probe beam Lr, and the phase modulated probe beam Lp. The light source pulse beam Ps and the excitation pulse beam Pe of the light detection device 100 are ultrashort pulse beams. Furthermore, the reference probe pulse beam Pr and the phase modulated probe pulse beam Pp have asymmetrical waveforms with a rapid rise and a slow fall and are arranged so as to be delayed by a predetermined time from the excitation pulse beam Pe. In the light detection device 100, the reference probe pulse beam Pr and the phase modulated probe pulse beam Pp have substantially identical waveforms (mutually similar waveforms) at different center wavelengths and are temporally superimposed.

CITATION LIST

Patent Literature

Patent Document 1: JP-A No. 2010-048805

SUMMARY OF INVENTION

Technical Problem

Here, amplitude-modulated coherent Raman scattering microscopes (hereinafter, "AM-SRS microscopes") and phase-modulated coherent Raman microscopes (hereinafter, "PM-SRS microscopes") have characteristics resulting from their respective configurations. That is, AM-SRS microscopes have the characteristic that they can image, at a high speed, information about the morphology of cells and tissue, for example, by detecting a strong Raman signal where the duration of vibration of molecules included in a living body itself such as water and lipids is short. On the other hand, PM-SRS microscopes have the characteristic that, by utilizing the relative time difference between the excitation beam and the probe beams, they can selectively detect, at a high contrast, low molecular weight substances having a relatively long duration of molecular vibration.

That is, conventionally, AM-SRS microscopes or PM-SRS microscopes have been separately used taking into account the purpose of observation and the features of the observation target, for example, and in accordance with their observation content. For example, AM-SRS microscopes have been selected when one wants to observe cells and tissue, for example, and PM-SRS microscopes have been selected when one wants to observe low molecular weight substances distributed in a living body, for example.

In fields such as medicine, for example, it would be extremely convenient if the structure of a living body and the distribution of a substance could be simultaneously imaged, as in observing the state of penetration of a drug into the skin. However, until now, using only an AM-SRS microscope or a PM-SRS microscope by itself has been considered, and for that reason, the correspondence between the structure of a living body itself such as its cells or tissue and the spatial distribution of small molecules therein has been unable to be visualized, which has been ill-suited for dynamic analysis of the localization, transport, and metabolism of molecules in a living body.

An embodiment of the present disclosure has been made in view of the above background, and it is an object thereof to provide a light detection device and a light detection method that can visualize biological structures such as cells and tissue and the spatial distribution of substances included in the biological structures and perform dynamic analysis of the localization, transport, and metabolism of molecules in a living body.

Solution to Problem

In order to achieve the above object, a light detection device pertaining to a first aspect includes: a laser light source that generates a light source pulse beam; a splitting unit that splits the light source pulse beam into a first pulse beam, a second pulse beam, and a third pulse beam; a first modulation unit that modulates the amplitude of the first pulse beam and can switch between executing and stopping the amplitude modulation; a second modulation unit that modulates the phase of the second pulse beam and can switch between executing and stopping the phase modulation; a first detection unit and a second detection unit that detect light; and a control unit that switches between and executes at least two of a first light detection mode in which it acquires a first image by detecting with the first detection unit a stimulated Raman scattering signal generated by applying to a sample a first combined beam in which the first pulse beam on which amplitude modulation has been executed and the second pulse beam on which phase modulation has been stopped are combined, a second light detection mode in which it acquires a second image by detecting with the first detection unit a stimulated Raman scattering signal generated by applying to the sample a second combined beam in which the first pulse beam on which amplitude modulation has been stopped, the second pulse beam on which phase modulation has been executed, and the third pulse beam are combined, and a third light detection mode in which it acquires a third image by detecting with the second detection unit confocal reflected light generated by applying to the sample the first pulse beam on which amplitude modulation has been executed and synthesizes at least two images that have been acquired to generate a composite image.

Furthermore, a light detection device pertaining to a second aspect is the light detection device pertaining to the first aspect, wherein in the first light detection mode the control unit acquires the first image by lock-in detecting a stimulated Raman signal included in the second pulse beam serving as an excitation beam, in the second light detection mode the control unit acquires the second image by using the first pulse beam as a first probe beam, using the second pulse beam as a second probe beam, and using the third pulse beam as an excitation beam and lock-in detecting, as a signal corresponding to a stimulated Raman scattering signal, an amplitude modulation signal applied to the first probe beam as a result of heterodyne interference caused by stimulated Raman signal light generated by the first probe beam and the second probe beam, and in the third light detection mode the control unit acquires the third image by lock-in detecting a modulation signal applied to the first pulse beam.

Furthermore, a light detection device pertaining to a third aspect is the light detection device pertaining to the first aspect or the second aspect, further including a first shutter that blocks the third pulse beam in the first light detection mode and a second shutter that blocks the second pulse beam and a third shutter that blocks the third pulse beam in the third light detection mode.

Furthermore, a light detection device pertaining to a fourth aspect is the light detection device pertaining to any of the first aspect to the third aspect, further including a first filter that removes the first pulse beam from the first combined beam and guides the second pulse beam to the first detection unit in the first light detection mode, a second filter that removes the second pulse beam and the third pulse beam from the second combined beam and guides the first pulse beam to the first detection unit in the second light detection mode, and a polarizing beam splitter that splits and extracts the confocal reflected light and an aperture that limits the confocal reflected light in the third light detection mode.

A light detection device pertaining to a fifth aspect is the light detection device pertaining to any of the first aspect to the fourth aspect, further comprising a dispersion correction unit that is disposed in at least one of a first optical path through which the first pulse beam passes and a second optical path through which the second pulse beam passes, and which corrects a difference between a cumulative dispersion of the first optical path and a cumulative dispersion of the second optical path and a delay correction unit that is disposed in at least one of the first optical path and the second optical path and corrects a difference between a cumulative delay of the first optical path and a cumulative delay of the second optical path.

In order to achieve the above object, a light detection method pertaining to a sixth aspect is a light detection method using a light detection device including a laser light source that generates a light source pulse beam, a splitting unit that splits the light source pulse beam into a first pulse beam, a second pulse beam, and a third pulse beam, a first modulation unit that modulates the amplitude of the first pulse beam and can switch between executing and stopping the amplitude modulation, a second modulation unit that modulates the phase of the second pulse beam and can switch between executing and stopping the phase modulation, and a first detection unit and a second detection unit that detect light, the method switching between and executing at least two of a first light detection mode in which it acquires a first image by detecting with the first detection unit a stimulated Raman scattering signal generated by applying to a sample a first combined beam in which the first pulse beam on which amplitude modulation has been executed and the second pulse beam on which phase modulation has been stopped are combined, a second light detection mode in which it acquires a second image by detecting with the first detection unit a stimulated Raman scattering signal generated by applying to the sample a second combined beam in which the first pulse beam on which amplitude modulation has been stopped, the second pulse beam on which phase modulation has been executed, and the third pulse beam are combined, and a third light detection mode in which it acquires a third image by detecting with the second detection unit confocal reflected light generated by applying to the sample the first pulse beam on which amplitude modulation has been executed and synthesizing at least two images that have been acquired to generate a composite image.

Advantageous Effects of Invention

According to the embodiment of the present disclosure, it becomes possible to provide a light detection device and a light detection method that can visualize biological structures such as cells and tissue and the spatial distribution of substances included in the biological structures and perform dynamic analysis of the localization, transport, and metabolism of molecules in a living body.

BRIEF DESCRIPTION OF DRAWINGS

FIG. 3 is a diagram showing settings in each mode of the light detection device pertaining to the embodiment.

DESCRIPTION OF EMBODIMENT

Figure 1:
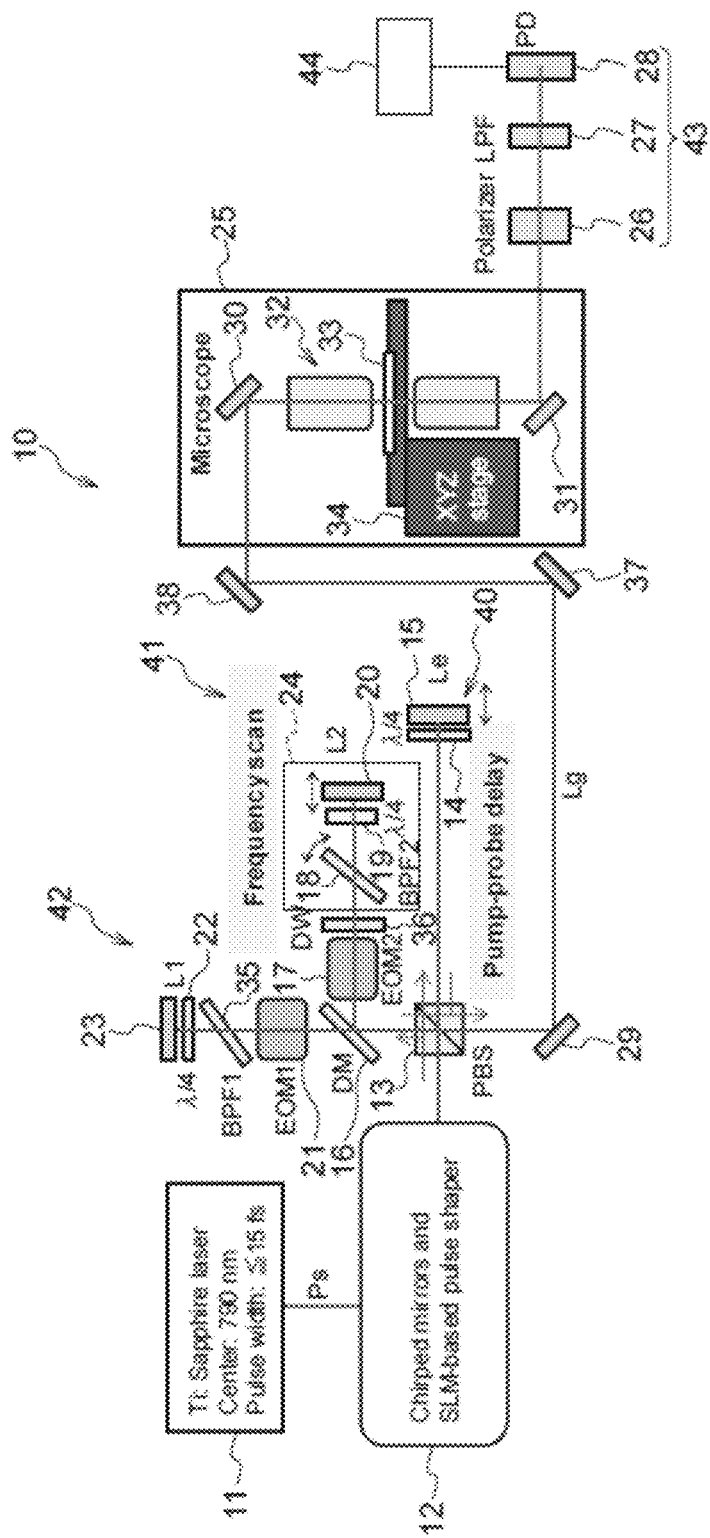
FIG. 1 is a block diagram showing an example of the configuration of a light detection device pertaining to an embodiment.

An embodiment of the present disclosure will be described in detail below with reference to the drawings. A light detection device pertaining to the present embodiment described below includes a mechanism for switching between an AM-SRS microscope configuration and a PM-SRS microscope configuration so that observation with an AM-SRS microscope and observation with a PM-SRS microscope can be performed by the same observation device and images acquired by both microscopes can be synthesized. The light detection device pertaining to the present embodiment is further configured to also have a confocal microscope function to enhance the function of observing morphology information.

Here, a confocal microscope is an optical system that receives, with a detector, light reflected from the surface of a sample. A confocal microscope is called a confocal optical system because it is designed so that when illumination light applied from a point light source is focused on the surface of a sample, the reflected light also becomes focused on the detector. In a confocal microscope, information just at the focal position passes through a pinhole and reaches the detector, while light outside the focal position is cut by the pinhole, so resolution is produced in the depth direction and an optical tomographic image can be obtained.

Here, in a case where an AM-SRS microscope or a PM-SRS microscope is used by itself, the correspondence between the structure of a living body itself such as its cells or tissue and the spatial distribution of small molecules therein is unable to be visualized, and dynamic analysis of the localization, transport, and metabolism of the molecules in the living body has not been possible. More specifically, in actual observation of drug molecules, if observation cannot be performed using the same reference point including the background component, there are cases where it is not clear where the small molecules one wants to observe are. In other words, in imaging biological tissue, there are cases where structures are not clearly distinguished just with information obtained by coherent Raman scattering. In such cases, it would be effective to add other contrast information such as confocal reflection with a confocal microscope.

However, in the case of acquiring a confocal reflection signal, if a high-sensitivity detector such as a photomultiplier tube (PMT) is used, the microscope must be shielded to prevent stray light. On the other hand, a normal photodiode has the problem that structure information ends up being buried in noise because its sensitivity is insufficient and its offset voltage also fluctuates. In contrast to this, an AM-SRS microscope or a PM-SRS microscope does not need to be shielded because it is basically a technology using modulation. Thus, in the present embodiment, a confocal microscope is configured to use an optical modulator used in AM-SRS to modulate the amplitude of light applied to a sample and lock-in detect modulated confocal reflected light. For this reason, complicated light-shielding equipment is unnecessary.

As described above, the light detection device pertaining to the present embodiment is configured to capture, in a case where a drug comprising small molecules penetrates from a certain interface for example, where the interface is with confocal reflection, acquire the state of background tissue and cells as image information at a high speed in an AM-SRS mode, and detect small molecules having a long molecular vibration in the tissue in a PM-SRS mode. By virtue of having the above configuration, the light detection device pertaining to the present embodiment can, using for example a biological sample as a subject, visualize label-free the concentration distribution of molecules in a biological structure while identifying their molecular species. As a result, a light detection device that dramatically enhances the usefulness of a coherent Raman scattering microscope is realized.

<Configuration of Light Detection Device>

Referring to FIG. 1, a light detection device 10 pertaining to the present embodiment will be described. As shown in FIG. 1, the light detection device 10 is configured to include a light source 11, a waveform shaping unit 12, a polarizing beam splitter (PBS) 13, an excitation pulse beam adjustment unit 40, a first probe pulse beam adjustment unit 41, a second probe pulse beam adjustment unit 42, a microscope 25, a light receiving unit 43, and a control unit 44. The light detection device 10 is, as described above, configurable as an AM-SRS microscope, a PM-SRS microscope, and a confocal microscope, but below, the configurations of the AM-SRS microscope and the PM-SRS microscope will be described with reference to FIG. 1 and the confocal microscope will be described separately with reference to FIG. 2. Furthermore, in the following description, causing the light detection device 10 to operate in the configurations of the AM-SRS microscope, the PM-SRS microscope, and the confocal microscope will be called an "AM-SRS mode", a "PM-SRS mode", and a "confocal mode", respectively, and when generically referring to the "AM-SRS mode" and the "PM-SRS mode", they will be called "SRS modes".

The light source 11 is a laser light source that generates an excitation beam Le and probe beams (a first probe beam L1 and a second probe beam L2) for generating an SRS signal. The excitation beam Le, the first probe beam L1, and the second probe beam L2 are selected in accordance with the mode of the light detection device 10. In the present embodiment, a pulsed excitation beam (an excitation pulse beam Pe) and probe beams (a first probe pulse beam P1 and a second probe pulse beam P2) are used, and the light source 11 generates a light source pulse beam Ps that becomes the source of these pulse beams. In the present embodiment, a femtosecond pulse is used as the light source pulse beam Ps. For that reason, the laser beam from the light source 11 is divided into three beams, the excitation beam Le, the first probe beam L1, and the second probe beam L2. The light source pulse beam Ps and the excitation pulse beam Pe pertaining to the present embodiment are ultrashort pulse beams.

Figure 8:
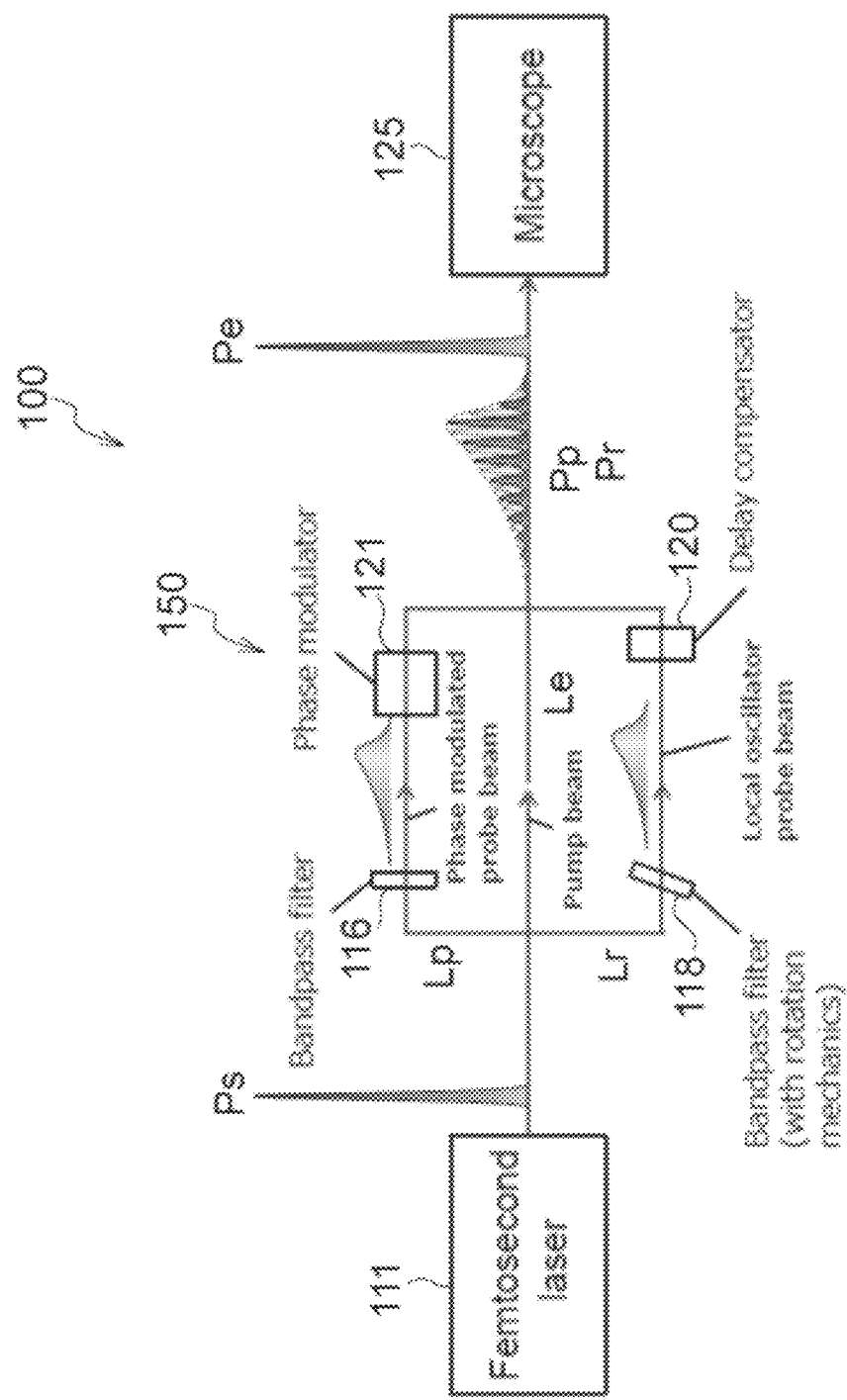
FIG. 8 is a block diagram showing the configuration of a light detection device pertaining to a comparative example.

The excitation pulse beam adjustment unit 40 adjusts the incident excitation pulse beam Pe, the first probe pulse beam adjustment unit 41 adjusts the incident first probe pulse beam P1, and the second probe pulse beam adjustment unit 42 adjusts the incident second probe pulse beam P2. The microscope 25 applies the excitation beam and the probe beams to a sample. The light receiving unit 43 receives Raman signal light generated in the sample, and the control unit 44 collectively controls the entire light detection device 10. Below, each of these parts will be described in detail. It will be noted that in the following description, in order to describe all the configurations shown in FIG. 1, description will be given with the PM-SRS mode in mind, which uses all the configurations. Consequently, the following description will describe the configuration in FIG. 8 in greater detail, with the first probe beam L1 corresponding to the reference probe beam Lr in FIG. 8 and the second probe beam L2 corresponding to the phase modulated probe beam Lp in FIG. 8.

In the light detection device 10 pertaining to the present embodiment, an ultrashort-pulse laser that generates a broad-band light source pulse beam Ps is used for the light source 11. In the present embodiment, as an example of the light source 11, a near-infrared broad-band femtosecond laser is used. More specifically, as shown in FIG. 1, as an example of the light source 11, a titanium sapphire laser with a center wavelength of 790 nm is used, and the pulse width is 15 femtoseconds (fs) or less. However, the wavelength and the pulse width of the light source 11 are not limited to this and may be set to appropriate values in accordance with the design content of the light detection device 10, for example. It will be noted that in the present embodiment the light source pulse beam Ps emitted from the light source 11 is linearly polarized in a predetermined direction. However, the way in which the light source pulse beam Ps is polarized is not limited to this, and it may also, for example, be circularly polarized or elliptically polarized.

The waveform shaping unit 12 compensates the light source pulse beam Ps to satisfy a desired characteristic. That is, the waveform shaping unit 12 is, as an example, configured to include dispersion compensating optical elements and a spatial light modulator (SLM) (not shown in the drawings), and the pulse width of applied light under an objective lens 32 described later is appropriately dispersion-compensated so as to become equal to the shortest pulse width emitted from the light source 11. It will be noted that, in the present embodiment, chirped mirrors that provide high reflectivity and negative second-order dispersion compensation with a dielectric multilayer film are used as an example of the dispersion compensating optical elements and a liquid crystal spatial light modulator is used as an example of the SLM.

The PBS 13 is an optical element that divides the laser beam generated by the light source 11 into two, the excitation beam Le and the probe beams (the first probe beam L1 and the second probe beam L2).

The excitation pulse beam adjustment unit 40 includes a λ/4-wave plate 14 and an end mirror 15. In FIG. 1, the optical path of the excitation beam Le is light source 11→waveform shaping unit 12→PBS 13→quarter-wave plate 14→end mirror 15→quarter-wave plate 14→PBS 13→mirror 29. The quarter-wave plate 14 first converts the excitation beam Le into circularly polarized light, which is then reflected by the end mirror 15 such that the polarization direction after reflection is changed to a direction different from the polarization direction of the light source pulse beam Ps so as to be reflected by the PBS 13. The end mirror 15 is movable in the optical axis direction of the excitation beam Le to thereby adjust a delay time imparted to the excitation pulse beam Pe so as to set a time difference between it and the probe pulse beams.

The first probe pulse beam adjustment unit 41 includes an optical modulator 17 (denoted as "EOM2" in FIG. 1), a dispersion compensator 36 (denoted as "DW" in FIG. 1), and a wavelength scanning unit 24, and the wavelength scanning unit 24 is configured to include a bandpass filter 18, a quarter-wave plate 19, and an end mirror 20. The optical path of the first probe beam L1 is light source 11→waveform shaping unit 12→PBS 13→bandpass filter 16 (denoted as "DM" in FIG. 1)→optical modulator 17→dispersion compensator 36→bandpass filter 18→quarter-wave plate 19→end mirror 20→quarter-wave plate 19→bandpass filter 18→dispersion compensator 36→optical modulator 17→bandpass filter 16→PBS 13→mirror 29.

The function of the quarter-wave plate 19 is the same as that of the quarter-wave plate 14. The optical modulator 17 is a modulator that modulates the amplitude of the first probe beam L1 in the AM-SRS mode and the confocal mode, and in the present embodiment an electro-optic modulator (EOM) is used as an example. The optical modulator 17 is connected to a drive circuit (not shown in the drawings), and the drive circuit is connected to the control unit 44.

As shown in FIG. 1, the bandpass filter 18 is a tunable filter that is rotatable about a predetermined axis of rotation and sets the center frequency of the first probe pulse beam P1. The end mirror 20 mainly compensates for variations in the delay of the first probe pulse beam P1 accompanying the rotation of the bandpass filter 18. The wavelength scanning unit 24 is connected to the control unit 44 described later, and the bandpass filter 18 and the end mirror 20 are controlled by the control unit 44.

The second probe pulse beam adjustment unit 42 is configured to include an optical modulator 21 (denoted as "EOM1" in FIG. 1), a bandpass filter 35 (denoted as "BPF1" in FIG. 1), a quarter-wave plate 22, and an end mirror 23. The optical path of the second probe beam L2 is light source 11→waveform shaping unit 12→PBS 13→bandpass filter 16→optical modulator 21→bandpass filter 35→quarter-wave plate 22→end mirror 23→quarter-wave plate 22→bandpass filter 35→optical modulator 21→bandpass filter 16→PBS 13→mirror 29. That is, in the present embodiment, the light source pulse beam Ps is divided into the excitation beam Le and the probe beams (the first probe beam L1 and the second probe beam L2) by the PBS 13 and is divided into the first probe beam L1 and the second probe beam L2 by the bandpass filter 16.

The optical modulator 21 is a phase modulator that modulates the phase of the second probe beam L2, and in the present embodiment an EOM is used as an example. The optical modulator 21 is connected to a drive circuit (not shown in the drawings), and the drive circuit is connected to the control unit 44. The bandpass filter 35 is a tunable filter that sets the center frequency of the second probe pulse beam P2. The function of the quarter-wave plate 22 is the same as that of the quarter-wave plate 14. Furthermore, the end mirror 23 adjusts the temporal positional relationship between the first probe pulse beam P1 and the second probe pulse beam P2. It will be noted that although in the present embodiment a configuration where the delay is adjusted by the end mirrors 15, 20, 23 is described as an example, the present disclosure is not limited to this and may also have a configuration using other optical elements, such as optical delay lines for example, as long as the mechanisms can vary the optical delay.

Here, the first probe pulse beam P1 and the second probe pulse beam P2 have asymmetrical waveforms with a rapid rise and a slow fall and are arranged so as to be delayed by a predetermined time from the excitation pulse beam Pe. In the present embodiment, the first probe pulse beam P1 and the second probe pulse beam P2 have substantially identical waveforms (mutually similar waveforms) with different center wavelengths and are temporally superimposed.

As shown in FIG. 1, the excitation beam Le, the first probe beam L1, and the second probe beam L2 are changed in direction by the mirror 29 and thereafter combined on the same axis to form a combined beam Lg, which is introduced via mirrors 37, 38 to the microscope 25. At this time, the relative delay time between the excitation pulse beam Pe and the probe pulse beams can be adjusted by the optical axis direction position of the end mirror 15 of the excitation pulse beam adjustment unit 40. Here, the mirrors 29, 37, and 38 are elements for changing the optical path and are not intended to be limited to the configuration shown in FIG. 1.

The microscope 25 is an optical microscope and is configured to include an objective lens 32, a stage 34, and mirrors 30, 31 for changing the beam direction. A sample 33 is placed on the stage 34, and the combined beam Lg incident on the objective lens 32 is applied to the sample 33. The sample 33 is, for example, biological cells into which a drug has penetrated. When the combined beam Lg is applied to the sample 33, an SRS signal resulting from molecular vibration of the drug molecules, for example, is generated based on the SRS process. It will be noted that the light detection device 10 pertaining to the present embodiment includes a scanning function in the depth direction (the Z-axis direction, which is the up and down direction of the page surface in FIG. 1). In the light detection device 10 pertaining to the present embodiment, scanning in the depth direction is performed by movement of the stage 34 in the Z-axis direction.

The light receiving unit 43 is configured to include a polarizer 26, a longpass filter 27, and a photodetector 28.

The polarizer 26 has a polarization axis in a direction different from (e.g., a direction orthogonal to) the polarization direction of the excitation beam Le and removes the excitation beam Le from the combined beam Lg. The longpass filter 27 is a filter that removes the second probe beam L2 from the combined beam Lg from which the excitation beam Le has been removed and which includes the first probe beam L1 and the second probe beam L2. This is because, in the present embodiment, the wavelength of the first probe beam L1 is set longer than the wavelength of the second probe beam L2. The photodetector 28 receives the first probe beam L1 and converts it into an electrical signal. A photodiode, for example, is used for the photodetector 28. The photodetector 28 is connected to the control unit 44, and a photodetection signal in the photodetector 28 is sent to the control unit 44. It will be noted that the reason for using the longpass filter 27 in the present embodiment is because the wavelength of the first probe beam L1 is set longer than the wavelength of the second probe beam L2 as described above. There are no particular restrictions on the relationship between the wavelength of the first probe beam L1 and the wavelength of the second probe beam L2, so in a case where the wavelength of the first probe beam L1 is set shorter than the wavelength of the second probe beam L2, a shortpass filter is used instead of the longpass filter 27.

That is, after passing through the microscope 25, out of the laser pulses of the excitation pulse beam Pe, the first probe pulse beam P1, and the second probe pulse beam P2 the excitation pulse beam Pe is blocked by the polarizer 26 and the second probe pulse beam P2 is blocked by the longpass filter 27, so that only the first probe pulse beam P1 passes through to the photodetector 28. The light intensity of the first probe pulse beam P1 is converted to current by the photodetector, and the light intensity modulated component superimposed on the first probe pulse beam P1 is detected by a lock-in amplifier. The light intensity modulated component detected by the lock-in amplifier is a signal component— that is, an SRS signal—derived from Raman scattering in the sample 33. The SRS signal is a signal proportional to the concentration of the sample (in the present embodiment, a drug as an example). It will be noted that although FIG. 1 describes as an example a configuration where the polarizer 26 and the longpass filter 27 are arranged in this order, this order may be reversed. However, practically, the current order is preferred to first remove the excitation pulse beam Pe.

The control unit 44 collectively controls the light detection device 10 and is configured to include a central processing unit (CPU), a read-only memory (ROM), and a random-access memory (RAM) (which are not shown in the drawings). The control unit 44 also performs light detection processing to extract, from the first probe beam L1 including SRS light generated in the sample 33, the frequency component of the SRS light. The light detection processing is executed by the CPU reading a light detection processing program stored in the ROM or the like and transferring it to the RAM or the like.

The control unit 44 is further connected to the drive circuits (including signal generators; not shown in the drawings) of the optical modulator 17 and the optical modulator 21, the photodetector 28, and the wavelength scanning unit 24. There are also cases where a signal generator and a high-voltage amplifier for generating an electrical signal for performing amplitude modulation by changing the drive voltage of the optical modulator 17, a signal generator and a high-voltage amplifier for generating an electrical signal for performing phase modulation by changing the drive voltage of the optical modulator 21, are provided inside the control unit 44 or externally attached thereto. In this case, the control unit 44 controls the signal generators to perform waveform control of the drive voltages for modulating the optical modulator 17 and the optical modulator 21. The control unit 44 can be configured using a common personal computer, for example. The control unit 44 drives the optical modulator 17 and the optical modulator 21 via the drive circuits, receives an amplitude modulation signal from the photodetector 28 to configure a lock-in amplifier, and extracts the SRS signal from the first probe pulse beam P1 whose amplitude has been modulated by heterodyne interference. More specifically, the control unit 44 lock-in detects, as a signal corresponding to the SRS signal, the amplitude modulation signal applied to the first probe pulse beam PL as a result of heterodyne interference by the first probe beam L1 and the second probe beam L2.

The wavelength scanning unit 24 is also connected to the control unit 44, and the control unit 44 controls the rotation of the bandpass filter 18 and the movement of the end mirror 20 included in the wavelength scanning unit 24.

As described above, in the light detection device and the light detection method pertaining to the present embodiment, a substance response (an instantaneous change in refractive index) generated by the vibration of molecules excited by the excitation beam Le is converted into intensity modulations of time-delayed probe beams, and the light intensity modulated component synchronous with the modulation frequency is detected using a demodulator such as a lock-in amplifier.

<Configuration in Confocal Mode>

Figure 2:
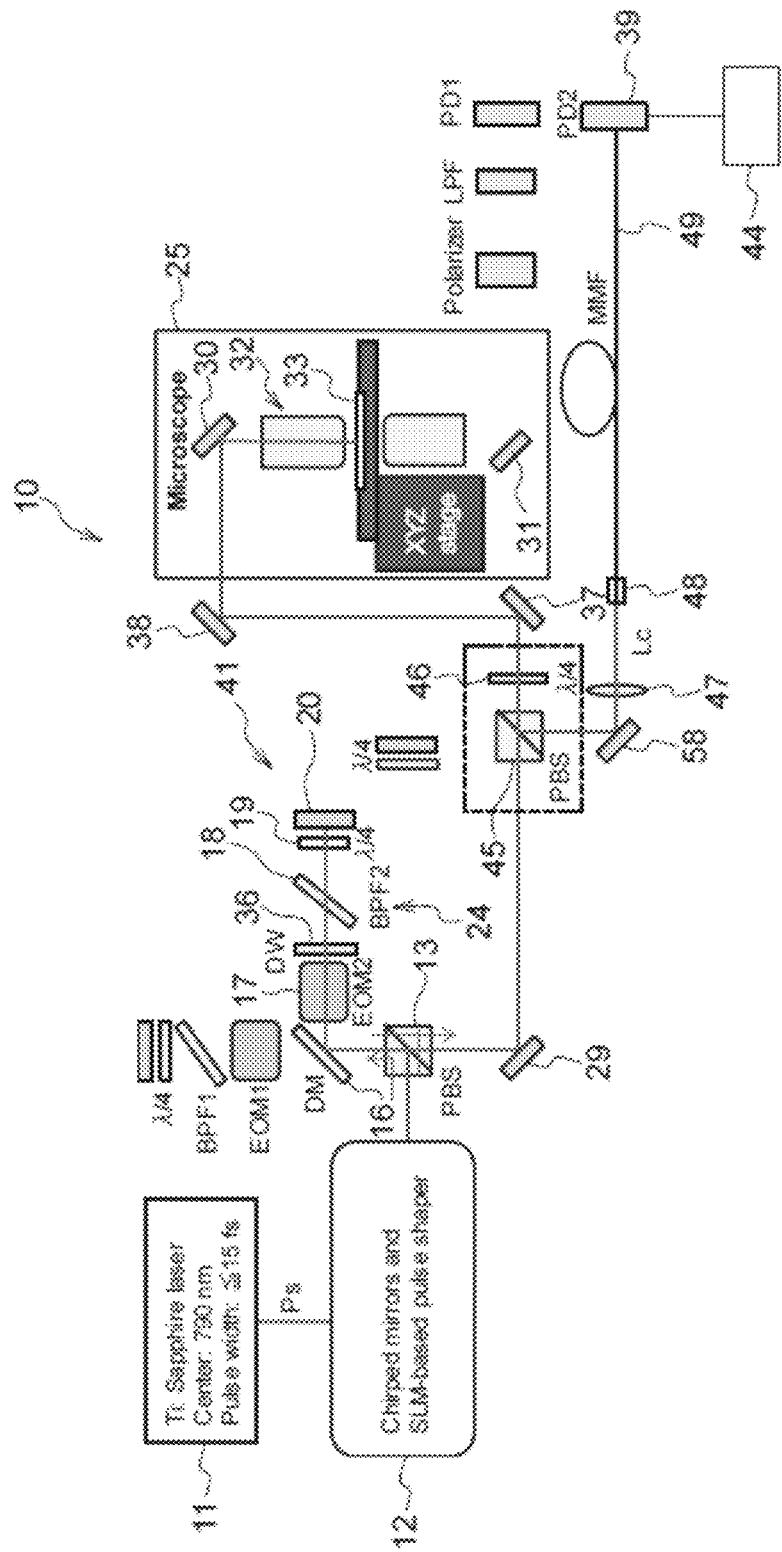
FIG. 2 is a block diagram showing the configuration of the light detection device pertaining to the embodiment in a confocal mode.

Next, with reference to FIG. 2, the configuration of the light detection device 10 in the confocal mode will be described. As shown in FIG. 2, in the confocal mode, the first probe pulse beam adjustment unit 41 is connected, and a PBS 45, a quarter-wave plate 46, a mirror 58, a lens 47, an aperture 48, a multi-mode fiber 49, and a photodetector 39 are added. In FIG. 2, the optical path of the light source pulse beam Ps emitted from the light source 11 in the confocal mode is light source 11→waveform shaping unit 12→PBS 13→bandpass filter 16→optical modulator 17→dispersion compensator 36→wavelength scanning unit 24→dispersion compensator 36→optical modulator 17→bandpass filter 16→PBS 13→mirror 29→PBS 45→quarter-wave plate 46→mirror 37→mirror 38→microscope 25→mirror 38→mirror 37→quarter-wave plate 46→PBS 45→mirror 58→lens 47→aperture 48→multi-mode fiber 49→photodetector 39. The photodetector 39 is connected to the control unit 44. The multi-mode fiber 49 has the function of transmitting confocal reflected light transmitted through the aperture 48 to the photodetector 39. Here, the mirrors 29, 37, 38, and 58 are elements for changing the optical path and are not intended to be limited to the configuration shown in FIG. 2. It will be noted that the PBS 45 is an element inserted when switching from the SRS modes to the confocal mode, and in the present embodiment a cube PBS is used.

In the confocal mode having the above optical system, the first probe beam L1, which is one of the two probe beams used in the PM-SRS mode, is used, and the aperture (opening) 48 corresponding to a confocal pinhole is disposed in the optical path to obtain confocal reflected light Lc. The light applied to the sample 33 in the confocal mode is condensed on the sample 33 by the same objective lens 32 for the light applied in the SRS modes, and the incident optical path to the sample 33 and the relative optical axis of the detection optical path from the sample 33 are adjusted so as to coincide with each other. The light applied to the sample 33 may also be circularly polarized. Furthermore, as described above, scanning in the depth direction is performed by movement of the stage 34 in the Z-axis direction. Then, the detection signal obtained by the confocal mode is recorded, stored, and finally superimposed on and displayed together with the detection signals in the SRS modes.

In other words, in the light detection device 10, because the AM-SRS microscope and the PM-SRS microscope are configured by the same device, the correlation between cells or biological tissue structures and the spatial distribution of small molecules therein can be obtained, so dynamic analysis of the localization, transport, and metabolism of the molecules becomes easier. Moreover, because morphology information obtained by the confocal microscope is obtained at the same time as information about molecular structure obtained by the coherent Raman signal, information about the in-tissue spatial distribution of molecular concentration is obtained with high accuracy.

Here, the characteristics of the confocal microscope pertaining to the present embodiment are as follows. That is, a common pulsed laser light source, optical modulator, and lock-in amplifier are used in the detection of the confocal signal by the confocal microscope and the detection of the SRS signals by the SRS microscopes pertaining to the present embodiment. Because of this, the cost of the device is reduced, and information about biological tissue structure can be acquired at a high SN ratio without being affected by low-frequency noise. Furthermore, the confocal microscope has a scanning function in the depth direction achieved by the movement of the stage 34 in the Z-axis direction rather than movement of the objective lens 32, so the transmissive detection system of the SRS microscopes and the reflective detection system of the confocal microscope can be made compatible. Moreover, the cube PBS 45 is used to switch to the confocal mode, so relative optical axis deviation from the observation system in the SRS modes is inhibited. Furthermore, circular polarization is used for the polarization of the light applied to the sample 33, so the confocal reflection signal can be efficiently acquired.

<Operation in Each Mode>

Figure 4:
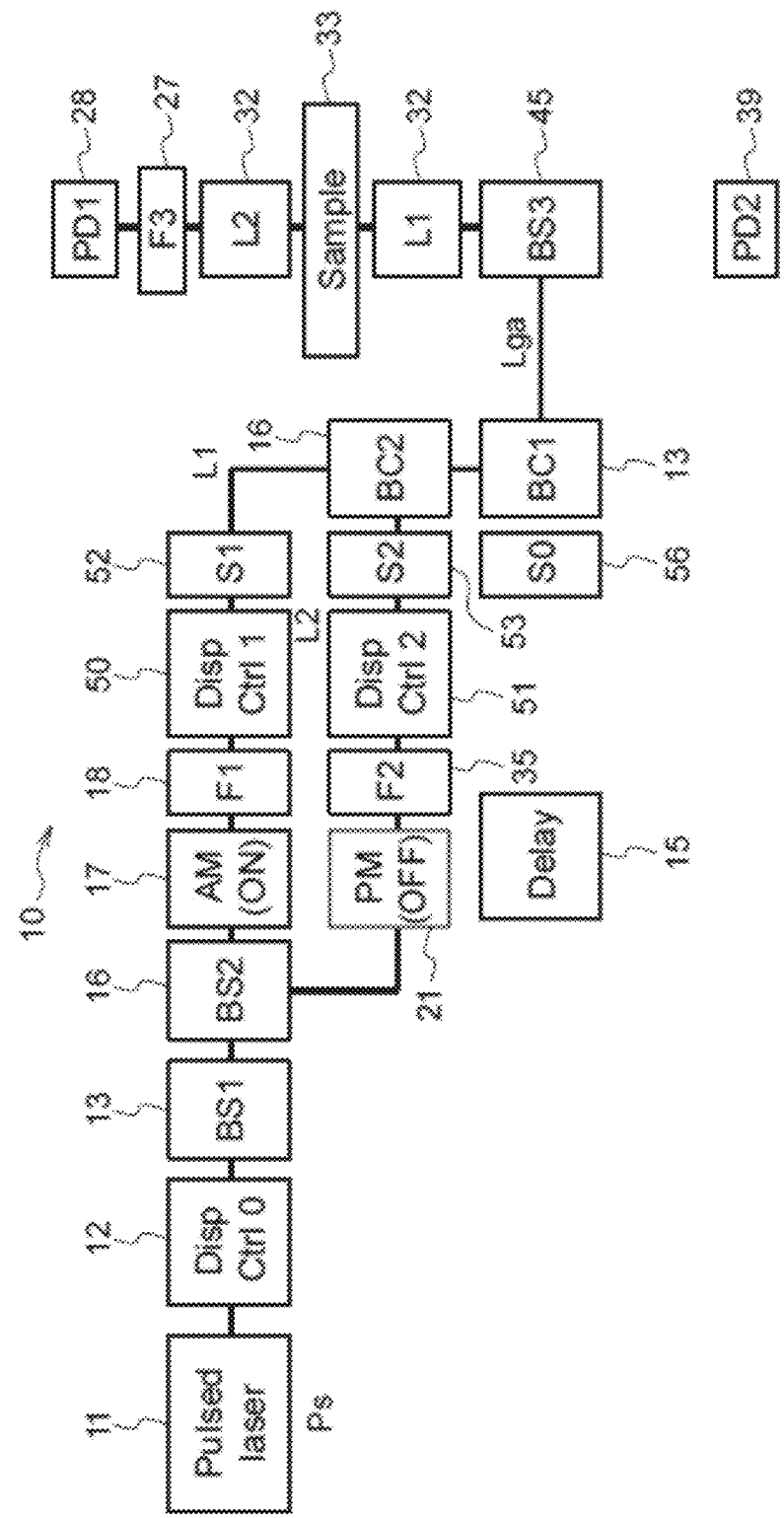
FIG. 4 is a block diagram describing operation in an AM-SRS mode pertaining to the embodiment.
Figure 5:
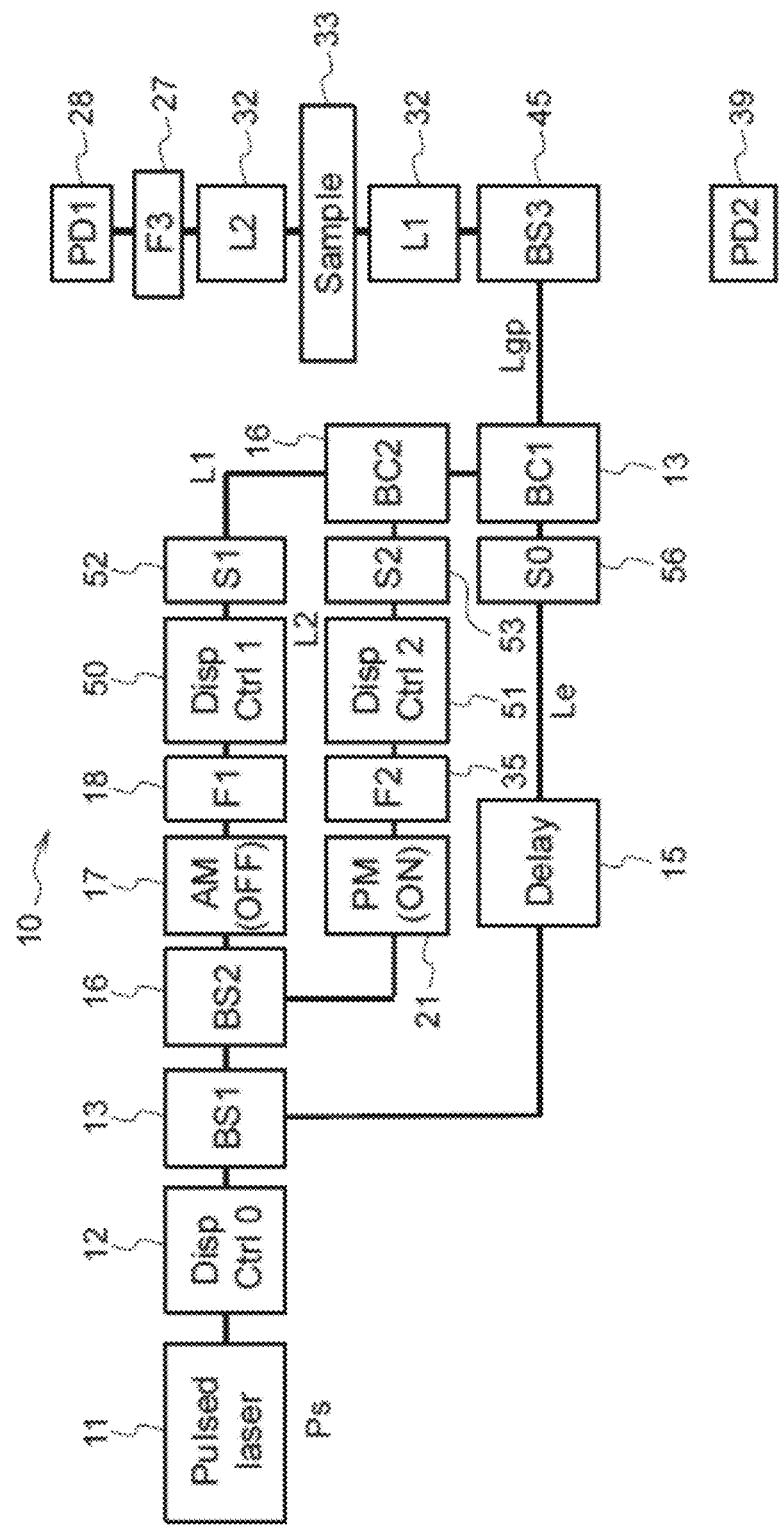
FIG. 5 is a block diagram describing operation in a PM-SRS mode pertaining to the embodiment.
Figure 6:
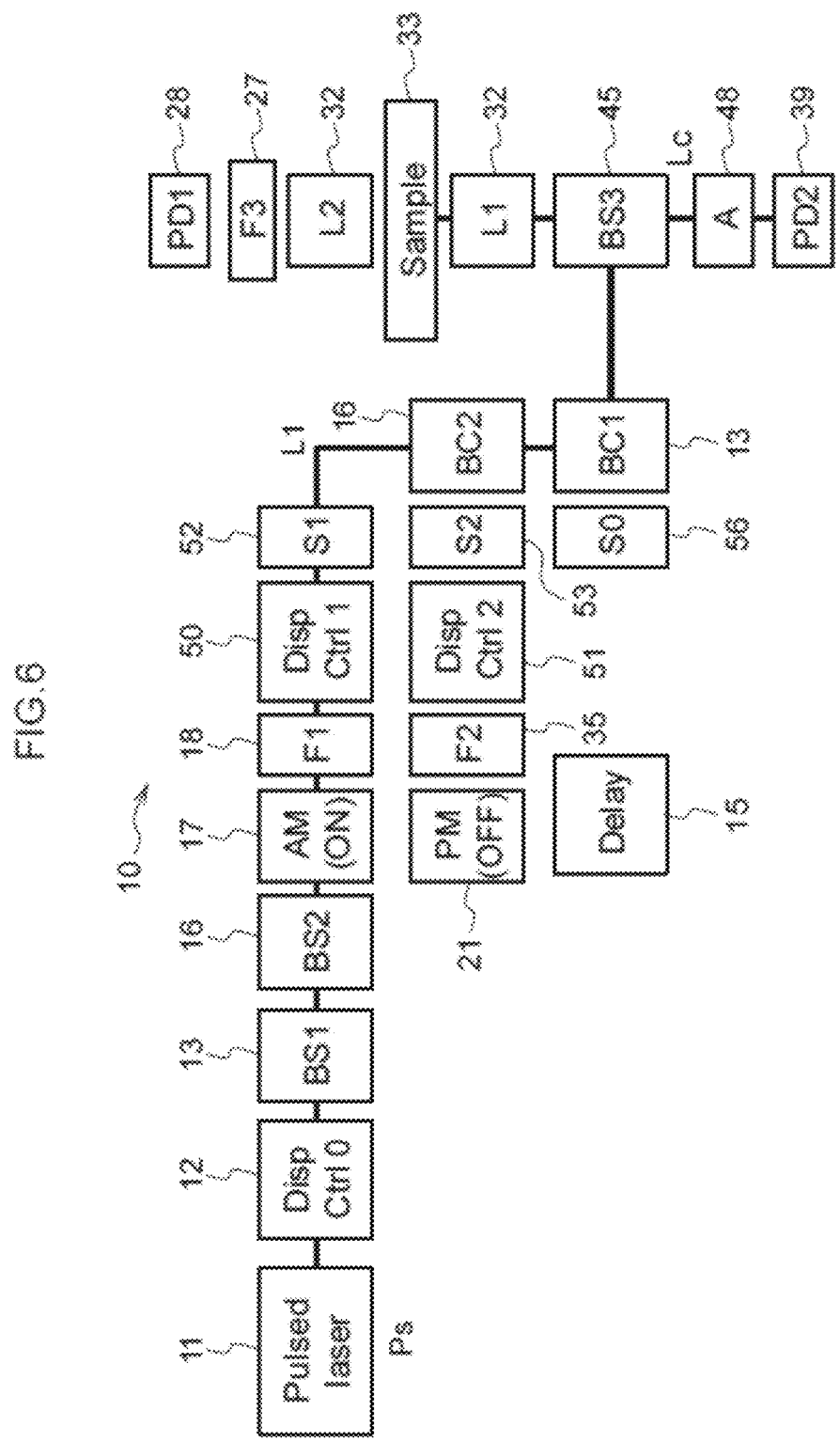
FIG. 6 is a block diagram describing operation in the confocal mode pertaining to the embodiment.

Next, with reference to FIG. 3 to FIG. 6, the operation of the light detection device 10 in each of the AM-SRS mode, the PM-SRS mode, and the confocal mode will be described in greater detail. FIG. 3 is a diagram showing settings of each configuration in each mode, FIG. 4 is a block diagram showing connections in the AM-SRS mode, FIG. 5 is a block diagram showing connections in the PM-SRS mode, and FIG. 6 is a block diagram showing connections in the confocal mode. In FIG. 4 to FIG. 6, some configurations are omitted from FIG. 1, and in FIG. 4 to FIG. 6, dispersion control devices 50, 51 and shutters 52, 53, 56 are added to FIG. 1, but basic operation is the same as in FIG. 1.

(Operation in AM-SRS Mode)

First, in the AM-SRS mode, as shown in FIG. 4, the light source pulse beam Ps emitted from the light source 11 (denoted as "Pulsed laser" in FIG. 4) passes through the waveform shaping unit 12 (denoted as "Disp Ctrl 0" in FIG. 4) and the PBS 13 (denoted as "BS1" in FIG. 4) and is split into two at the bandpass filter 16 (denoted as "B52" in FIG. 4). This splitting-into-two corresponds to the splitting into the first probe beam L1 and the second probe beam L2. In the AM-SRS mode, splitting does not occur on the excitation beam Le side shown in FIG. 1. However, in actual operation, the excitation beam Le is blocked by the shutter 56 described later. One of the light source pulse beams Ps split into two passes through the optical modulator 17 (denoted as "AM" in FIG. 4), the bandpass filter 18 (denoted as "F1" in FIG. 4), the dispersion control device 50 (denoted as "Disp Ctrl 1" in FIG. 4), and the shutter 52 and advances to the bandpass filter 16 (denoted as "BC2" in FIG. 4) and the PBS 13 (denoted as "BC1" in FIG. 4). Meanwhile, the other of the light source pulse beams Ps split into two passes through the optical modulator 21 (denoted as "PM" in FIG. 4), the bandpass filter 35 (denoted as "F2" in FIG. 4), the dispersion control device 51 (denoted as "Disp Ctrl 2" in FIG. 4), and the shutter 53 and advances to the bandpass filter 16 and the PBS 13.

The first probe beam L1 and the second probe beam L2 are combined at the bandpass filter 16 to form a combined beam Lga. The combined beam Lga passes through the PBS 45 (denoted as "BS3" in FIG. 4) and the objective lens 32 (denoted as "L1, L2" in FIG. 4) and thereafter is transmitted through the sample 33, and the light transmitted through the sample 33 passes through the longpass filter 27 (denoted as "F3" in FIG. 4) and is made incident on the photodetector 28 (denoted as "PD1" in FIG. 4). Here, the dispersion control devices 50, 51 are devices that adjust the dispersion of light passing therethrough, and adjust (as an example, equalize) the relationship between dispersion on the first probe beam L1 side and dispersion on the second probe beam L2 side. The shutters 52, 53 are, for example, optical switches that control the passage/blocking of light.

Regarding settings in the AM-SRS mode, as shown in FIG. 3, the excitation beam Le is turned off, the first probe beam L1 is turned on, and the second probe beam L2 is turned on. Here, in the present embodiment "on" means allowing the light to pass through and "off" means blocking the light. Furthermore, the modulation operation of the optical modulator 17, which is the amplitude modulator, is enabled (turned on), and the modulation operation of the optical modulator 21, which is the phase modulator, is disabled (turned off). Consequently, as shown in FIG. 3, RF modulation is amplitude modulation in which the first probe beam L1 is the light subjected to modulation. Additionally, when received by the photodetector 28, the first probe beam L1 is cut and the second probe beam L2 is the detected light. Although the detection method shown in FIG. 4 is a transmissive method, it may of course also be a reflective method. As shown in FIG. 3, the information acquired in the present AM-SRS mode is mainly chemical information such as a drug concentration map. Here, in the light detection device 10 pertaining to the present embodiment, the waveform of the RF modulation signal in the AM-SRS mode is a sine wave as an example.

(Operation in PM-SRS Mode)

Next, operation in the PM-SRS mode will be described with reference to FIG. 3 and FIG. 5. As shown in FIG. 5, in the PM-SRS mode, the light source pulse beam Ps emitted from the light source 11 passes through the waveform shaping unit 12 and is thereafter split into two at the PBS 13. One of the light source pulse beams Ps split into two at the PBS 13 passes as the excitation beam Le through the end mirror 15 (denoted as "Delay" in FIG. 5) and the shutter 56 (denoted as "S0" in FIG. 5) and is guided to the PBS 13. Furthermore, the other of the light source pulse beams Ps split into two at the PBS 13 is split into two at the bandpass filter 16. This splitting-into-two corresponds to the splitting into the first probe beam L1 and the second probe beam L2, and the paths of each of the probe beams are the same as in the AM-SRS mode, so detailed description thereof will be omitted.

One of the light source pulse beams Ps split into two at the bandpass filter 16 passes through the optical modulator 17, the bandpass filter 18, the dispersion control device 50, and the shutter 52 and advances to the bandpass filter 16 and the PBS 13. Meanwhile, the other of the light source pulse beams Ps split into two passes through the optical modulator 21, the bandpass filter 35, the dispersion control device 51, and the shutter 53 and advances to the bandpass filter 16 and the PBS 13. The first probe beam L1 and the second probe beam L2 are combined at the bandpass filter 16, and the combined beam is further combined with the excitation beam Le at the PBS 13 to form a combined beam Lgp. The combined beam Lgp passes through the PBS 45 and the objective lens 32 and is thereafter transmitted through the sample 33, and the transmitted light transmitted through the sample 33 passes through the longpass filter 27 and is made incident on the photodetector 28.

Regarding settings in the PM-SRS mode, as shown in FIG. 3, the excitation beam Le is turned on, the first probe beam L1 is turned on, and the second probe beam L2 is turned on. Furthermore, the modulation operation of the optical modulator 21, which is the phase modulator, is enabled (turned on), and the modulation operation of the optical modulator 17, which is the amplitude modulator, is disabled (turned off). Consequently, as shown in FIG. 3, RF modulation is phase modulation in which the second probe beam L2 is the light subjected to modulation. It will be noted that in the light detection device 10 pertaining to the present embodiment, the waveform of the RF modulation signal in the present PM-SRS mode is a sawtooth (sawtooth-shaped) wave as an example. Additionally, when received by the photodetector 28, the excitation beam Le and the second probe beam are cut and the first probe beam is the detected light. Although the detection method shown in FIG. 5 is a transmissive method, it may of course also be a reflective method. As shown in FIG. 3, the information acquired in the present PM-SRS mode is mainly chemical information such as a drug concentration map. It will be noted that background noise is inhibited more in the concentration map acquired in the PM-SRS mode than in the concentration map acquired in the AM-SRS mode.

Here, dispersion correction between the AM-SRS mode and the PM-SRS mode will be described. In the PM-SRS mode, the probe beams (the first probe beam L1 and the second probe beam L2) have asymmetrical waveforms due to the effect of nonlinear dispersion using the bandpass filter 18 and the bandpass filter 35 (see FIG. 8). Consequently, differences in dispersion in both are corrected by the bandpass filter 18 of the first probe pulse beam adjustment unit 41 and the dispersion control device 50 and by the bandpass filter 35 of the second probe pulse beam adjustment unit 42 and the dispersion control device 51 so that effects of the non-linear effect do not appear in the AM-SRS mode.

(Operation in Confocal Mode)

Next, operation in the confocal mode will be described with reference to FIG. 3 and FIG. 6. As shown in FIG. 6, in the confocal mode, the light source pulse beam Ps emitted from the light source 11 passes through the waveform shaping unit 12, thereafter passes through the PBS 13, the bandpass filter 16, the optical modulator 17, the bandpass filter 18, the dispersion control device 50, the shutter 52, the bandpass filter 16, and the PBS 13, and is guided to the PBS 45. The light source pulse beam Ps that has passed through the PBS 45 is applied to the sample 33 by the objective lens 32 denoted as L1, and the light reflected by the sample 33 again passes through the objective lens 32 (L1) and the PBS 45. The light that has passed through the PBS 45 is made incident as confocal reflected light Lc via the aperture 48 on the photodetector 39. That is, in the confocal mode, only the first probe beam L1 is used, and in FIG. 6 the second probe beam L2 is blocked by the shutter 53 and the excitation beam Le is blocked by the shutter 56.

Regarding settings in the confocal mode, as shown in FIG. 3, the excitation beam Le is turned off, the first probe beam L1 is turned on, and the second probe beam L2 is turned off. Furthermore, the modulation operation of the optical modulator 17, which is the amplitude modulator, is enabled (turned on). Consequently, as shown in FIG. 3, RF modulation is amplitude modulation in which the first probe beam L1 is the light subjected to modulation, and the detection method is a reflective method. Furthermore, the detected light is the first probe beam L1. Here, as shown in FIG. 3, the information acquired in the present confocal mode is mainly morphology information based on light scattering.

<Light Detection Processing>

Figure 7:
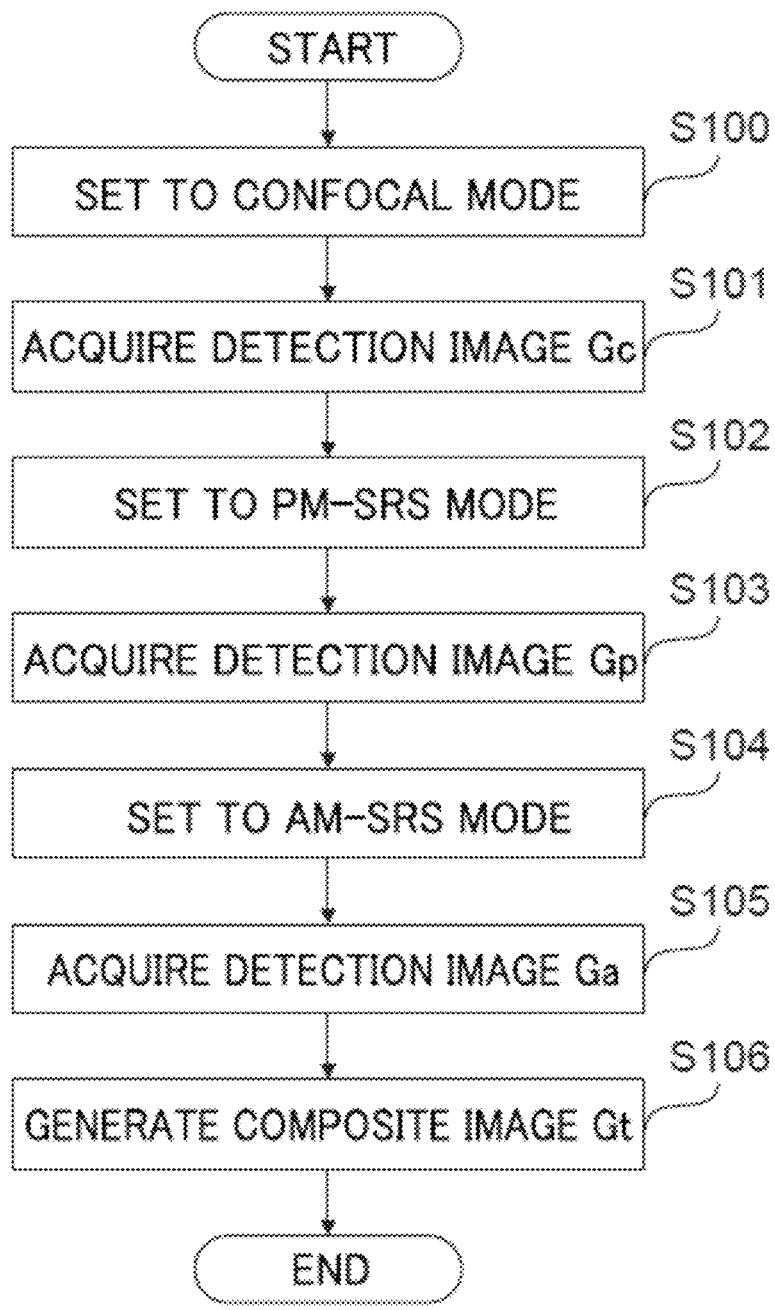
FIG. 7 is a flowchart showing a flow of processes of a light detection processing program pertaining to the embodiment.

Next, with reference to FIG. 7, light detection processing executed in the light detection device 10 pertaining to the present embodiment will be described. FIG. 7 is a flowchart showing a flow of processes of a light detection processing program executed in the light detection processing. The light detection processing program is stored in storage means such as the ROM (not shown in the drawings) of the light detection device 10, and when an instruction to start execution is received via a user interface unit or the like (not shown in the drawings) of the light detection device 10, the CPU (not shown in the drawings) reads the light detection processing program from the storage means such as the ROM, transfers it to the RAM or the like, and executes it.

In step S100, the configuration of the light detection device 10 is set to the configuration in the confocal mode shown in FIG. 6. At this time, the amplitude modulation operation of the optical modulator 17 is turned on (enabled).

In step S101, a detection image Gc obtained by the confocal mode is acquired. The detection image Gc is mainly an image including tissue structure information in the depth direction.

In step S102, the configuration of the light detection device 10 is set to the configuration in the PM-SRS mode shown in FIG. 5. At this time, the phase modulation operation of the optical modulator 21 is turned on (enabled) and the amplitude modulation operation of the optical modulator 17 is turned off (disabled). Furthermore, the relative delay time between the excitation beam Le and the probe beams (the first probe beam L1 and the second probe beam L2) is set in advance.

In step S103, a detection image Gp obtained by the PM-SRS mode is acquired. The detection image Gp is mainly an image including molecular concentration information in the depth direction.

In step S104, the configuration of the light detection device 10 is set to the configuration in the AM-SRS mode shown in FIG. 4. At this time, the amplitude modulation operation of the optical modulator 17 is turned on (enabled) and the phase modulation operation of the optical modulator 21 is turned off (disabled).

In step S105, a detection image Ga obtained by the AM-SRS mode is acquired. The detection image Ga is mainly an image including molecular concentration information in the depth direction.

In step S106, the detection images Gc, Gp, and Ga are synthesized to generate a composite image Gt. Thereafter, the light detection processing program is ended. The composite image Gt that has been generated may be displayed on a display unit such as a liquid crystal display (not shown in the drawings) and/or may be stored in a storage unit such as the RAM.

It will be noted that although in the present embodiment a configuration where the detection images are acquired in the order of the confocal mode, the PM-SRS mode, and the AM-SRS mode has been described as an example, the present disclosure is not limited to this, and the detection images may be acquired in any order.

Characteristics of Light Detection Device Pertaining to the Present Embodiment

The basic characteristics of the light detection device 10 pertaining to the present embodiment are as follows. That is, a PM-SRS microscope can, by utilizing the relative time difference between the excitation beam and the probe beams, selectively detect, at a high contrast, molecules having a relatively long duration of molecular vibration. On the other hand, an AM-SRS microscope can image, at a high speed, information about the morphology of cells and tissue, for example, by detecting a strong Raman signal where the duration of vibration of molecules included in a living body itself such as water and lipids is short. The light detection device 10 pertaining to the present embodiment incorporates an AM-SRS microscope and a PM-SRS microscope into the same device as a confocal microscope, whereby molecular structure information obtained by a coherent Raman signal and morphology information obtained by confocal reflection are simultaneously obtained, so information about the in-tissue spatial distribution of molecular concentration is obtained with high accuracy. Furthermore, the correlation between cells or biological tissue structures and the spatial distribution of small molecules present therein can be obtained, so dynamic analysis of the localization, transport, and metabolism of the molecules becomes easier.

Furthermore, other characteristics of the light detection device 10 pertaining to the present embodiment are as follows. That is, the optical paths of the amplitude modulation system (the first probe pulse beam adjustment unit 41) and the phase modulation system (the second probe pulse beam adjustment unit 42) are divided, with the amplitude modulator being disposed in the optical path of the amplitude modulation system and the phase modulator being disposed in the optical path of the phase modulation system. Because of this, the roles of the two probe beams are separated beforehand; in other words, the optical systems are fixed by their modulation method. As a result, spatial positional deviation between the amplitude modulation system and the phase modulation system is inhibited, and the wavenumber of the Raman peak is inhibited from relatively shifting, so adjustment of the light detection device 10 is greatly simplified.

Moreover, the optical path of the amplitude modulation system and the optical path of the phase modulation system are relatively dispersion compensated and are adjusted so as to have substantially the same amount of delay and substantially the same amount of dispersion. In other words, correction elements (the end mirrors 20, 23) for compensating for time delay amounts due to differences in optical modulators and correction elements (the dispersion control devices 50, 51) for compensating for dispersion amounts are used. For that reason, light detection sensitivity or wavenumber resolution can be improved.

It will be noted that although in the present embodiment a configuration combining three types of microscopes, a confocal microscope, an AM-SRS microscope, and a PM-SRS microscope, was described as an example, the present disclosure is not limited to this and may also have a configuration combining at least two types of microscopes among a confocal microscope, an AM-SRS microscope, and a PM-SRS microscope. For example, the combination may be determined by comparing and considering the features of each of a confocal microscope, an AM-SRS microscope, and a PM-SRS microscope such as described above.

Furthermore, although in the present embodiment a configuration using separate optical modulators as the amplitude modulator and the phase modulator was described as an example, one optical modulator may be used in common as long as the optical modulator can switch between and perform both amplitude modulation and phase modulation.

The disclosure of Japanese Patent Application 2020-002107 filed on Jan. 9, 2020, is incorporated in its entirety by reference herein.

All documents, patent applications, and technical standards mentioned in this specification are incorporated herein by reference to the same extent as if each individual document, patent application, or technical standard were specifically and individually indicated to be incorporated by reference.

REFERENCE SIGNS LIST

10 Light Detection Device
11 Light Source
12 Waveform Shaping Unit
13 PBS
14 Quarter-wave Plate
15 End Mirror
16 Bandpass Filter
17 Optical Modulator
18 Bandpass Filter
19 Quarter-wave Plate
20 End Mirror
21 Optical Modulator
22 Quarter-wave Plate
23 End Mirror
24 Wavelength Scanning Unit
25 Microscope
26 Polarizer
27 Longpass Filter
28 Photodetector
29, 30, 31 Mirrors
32 Objective Lens
33 Sample
34 Stage
35 Bandpass Filter
36 Dispersion Compensator
37, 38 Mirrors
39 Photodetector
40 Excitation Pulse Beam Adjustment Unit
41 First Probe Pulse Beam Adjustment Unit
42 Second Probe Pulse Beam Adjustment Unit
43 Light Receiving Unit
44 Control Unit
45 PBS
46 Quarter-wave Plate
47 Lens
48 Aperture
49 Multi-mode Fiber
50, 51 Dispersion Control Devices
52, 53, 56 Shutters
58, 59 Mirrors
100 Light Detection Device
111 Light Source
116 Bandpass Filter
118 Bandpass Filter
120 End Mirror
121 Phase Modulator
125 Microscope
150 Pulse Beam Generation Unit
Gc, Gp, Ga Detection Images, Gt Composite Image, Le Excitation Beam, L1 First Probe Beam, L2 Second Probe Beam, Lr Reference Probe Beam, Lp Phase Modulated Probe Beam, Lg, Lga, Lgp Combined Beams, Lc Confocal Reflected Light, P1 First Probe Pulse Beam, P2 Second Probe Pulse Beam, Ps Light Source Pulse Beam, Pe Excitation Pulse Beam, Pp Phase Modulated Probe Pulse Beam, Pr Reference Probe Pulse Beam

The invention claimed is:

1. A light detection device comprising:
a laser light source that generates a light source pulse beam;
a splitting unit that splits the light source pulse beam into a first pulse beam, a second pulse beam, and a third pulse beam;
a first modulation unit that modulates an amplitude of the first pulse beam and can switch between executing and stopping amplitude modulation;
a second modulation unit that modulates a phase of the second pulse beam and can switch between executing and stopping phase modulation;
a first detection unit and a second detection unit that detect light; and
a control unit that switches between and executes at least two of:
a first light detection mode in which a first image is acquired by detecting, with the first detection unit, a stimulated Raman scattering signal generated by applying, to a sample, a first combined beam in which the first pulse beam on which amplitude modulation has been executed and the second pulse beam on which phase modulation has been stopped are combined,
a second light detection mode in which a second image is acquired by detecting, with the first detection unit, a stimulated Raman scattering signal generated by applying, to the sample, a second combined beam in which the first pulse beam on which amplitude modulation has been stopped, the second pulse beam on which phase modulation has been executed, and the third pulse beam are combined, or
a third light detection mode in which a third image is acquired by detecting, with the second detection unit, confocal reflected light generated by applying, to the sample, the first pulse beam on which amplitude modulation has been executed,
wherein the control unit synthesizes at least two images that have been acquired to generate a composite image.

2. The light detection device of claim 1, wherein:
in the first light detection mode, the control unit acquires the first image by lock-in detecting a stimulated Raman signal included in the second pulse beam serving as an excitation beam, in the second light detection mode, the control unit acquires the second image by using the first pulse beam as a first probe beam, using the second pulse beam as a second probe beam, and using the third pulse beam as an excitation beam and lock-in detecting, as a signal corresponding to a stimulated Raman scattering signal, an amplitude modulation signal applied to the first probe beam as a result of heterodyne interference caused by stimulated Raman signal light generated by the first probe beam and the second probe beam, and in the third light detection mode, the control unit acquires the third image by lock-in detecting a modulation signal applied to the first pulse beam.

3. The light detection device of claim 1, further comprising:
a first shutter that blocks the third pulse beam in the first light detection mode, and
a second shutter that blocks the second pulse beam and a third shutter that blocks the third pulse beam in the third light detection mode.

4. The light detection device of claim 1, further comprising:
a first filter that removes the first pulse beam from the first combined beam and guides the second pulse beam to the first detection unit in the first light detection mode,
a second filter that removes the second pulse beam and the third pulse beam from the second combined beam and guides the first pulse beam to the first detection unit in the second light detection mode, and
a polarizing beam splitter that splits and extracts the confocal reflected light and an aperture that limits the confocal reflected light in the third light detection mode.

5. A light detection method using a light detection device including a laser light source that generates a light source pulse beam, a splitting unit that splits the light source pulse beam into a first pulse beam, a second pulse beam, and a third pulse beam, a first modulation unit that modulates an amplitude of the first pulse beam and can switch between executing and stopping amplitude modulation, a second modulation unit that modulates a phase of the second pulse beam and can switch between executing and stopping phase modulation, and a first detection unit and a second detection unit that detect light,
the method switching between and executing at least two of:
a first light detection mode in which a first image is acquired by detecting, with the first detection unit, a stimulated Raman scattering signal generated by applying, to a sample, a first combined beam in which the first pulse beam on which amplitude modulation has been executed and the second pulse beam on which phase modulation has been stopped are combined,
a second light detection mode in which a second image is acquired by detecting, with the first detection unit, a stimulated Raman scattering signal generated by applying, to the sample, a second combined beam in which the first pulse beam on which amplitude modulation has been stopped, the second pulse beam on which phase modulation has been executed, and the third pulse beam are combined, or
a third light detection mode in which a third image is acquired by detecting, with the second detection unit, confocal reflected light generated by applying, to the sample, the first pulse beam on which amplitude modulation has been executed, wherein the method includes synthesizing at least two images that have been acquired to generate a composite image.

6. The light detection device of claim 1, wherein the control unit switches between and executes
a first light detection mode in which a first image is acquired by detecting, with the first detection unit, a stimulated Raman scattering signal generated by applying, to a sample, a first combined beam in which the first pulse beam on which amplitude modulation has been executed and the second pulse beam on which phase modulation has been stopped are combined, and
a second light detection mode in which a second image is acquired by detecting, with the first detection unit, a stimulated Raman scattering signal generated by applying, to the sample, a second combined beam in which the first pulse beam on which amplitude modulation has been stopped, the second pulse beam on which phase modulation has been executed, and the third pulse beam are combined.

7. The light detection device of claim 1, wherein the control unit switches between and executes
a second light detection mode in which a second image is acquired by detecting, with the first detection unit, a stimulated Raman scattering signal generated by applying, to the sample, a second combined beam in which the first pulse beam on which amplitude modulation has been stopped, the second pulse beam on which phase modulation has been executed, and the third pulse beam are combined, and
a third light detection mode in which a third image is acquired by detecting, with the second detection unit, confocal reflected light generated by applying, to the sample, the first pulse beam on which amplitude modulation has been executed.

8. The light detection device of claim 1, wherein the control unit switches between and executes
a first light detection mode in which a first image is acquired by detecting, with the first detection unit, a stimulated Raman scattering signal generated by applying, to a sample, a first combined beam in which the first pulse beam on which amplitude modulation has been executed and the second pulse beam on which phase modulation has been stopped are combined, and
a third light detection mode in which a third image is acquired by detecting, with the second detection unit, confocal reflected light generated by applying, to the sample, the first pulse beam on which amplitude modulation has been executed.

9. The light detection method of claim 5, wherein the method switching between and executing
a first light detection mode in which a first image is acquired by detecting, with the first detection unit, a stimulated Raman scattering signal generated by applying, to a sample, a first combined beam in which the first pulse beam on which amplitude modulation has been executed and the second pulse beam on which phase modulation has been stopped are combined, and
a second light detection mode in which a second image is acquired by detecting, with the first detection unit, a stimulated Raman scattering signal generated by applying, to the sample, a second combined beam in which the first pulse beam on which amplitude modulation has been stopped, the second pulse beam on which phase modulation has been executed, and the third pulse beam are combined.

10. The light detection method of claim 5, wherein the method switching between and executing
- a second light detection mode in which a second image is acquired by detecting, with the first detection unit, a stimulated Raman scattering signal generated by applying, to the sample, a second combined beam in which the first pulse beam on which amplitude modulation has been stopped, the second pulse beam on which phase modulation has been executed, and the third pulse beam are combined, and
- a third light detection mode in which a third image is acquired by detecting, with the second detection unit, confocal reflected light generated by applying, to the sample, the first pulse beam on which amplitude modulation has been executed.

11. The light detection method of claim 5, wherein the method switching between and executing
- a first light detection mode in which a first image is acquired by detecting, with the first detection unit, a stimulated Raman scattering signal generated by applying, to a sample, a first combined beam in which the first pulse beam on which amplitude modulation has been executed and the second pulse beam on which phase modulation has been stopped are combined, and
- a third light detection mode in which a third image is acquired by detecting, with the second detection unit, confocal reflected light generated by applying, to the sample, the first pulse beam on which amplitude modulation has been executed.

12. The light detection method of claim 5, wherein
- in the first light detection mode, the control unit acquires the first image by lock-in detecting a stimulated Raman signal included in the second pulse beam serving as an excitation beam,
- in the second light detection mode, the control unit acquires the second image by using the first pulse beam as a first probe beam, using the second pulse beam as a second probe beam, and using the third pulse beam as an excitation beam and lock-in detecting, as a signal corresponding to a stimulated Raman scattering signal, an amplitude modulation signal applied to the first probe beam as a result of heterodyne interference caused by stimulated Raman signal light generated by the first probe beam and the second probe beam, and
- in the third light detection mode, the control unit acquires the third image by lock-in detecting a modulation signal applied to the first pulse beam.

13. The light detection method of claim 5, wherein the light detection device further comprises:
- a first shutter that blocks the third pulse beam in the first light detection mode, and
- a second shutter that blocks the second pulse beam and a third shutter that blocks the third pulse beam in the third light detection mode.

14. The light detection method of claim 5, wherein the light detection device further comprises:
- a first filter that removes the first pulse beam from the first combined beam and guides the second pulse beam to the first detection unit in the first light detection mode,
- a second filter that removes the second pulse beam and the third pulse beam from the second combined beam and guides the first pulse beam to the first detection unit in the second light detection mode, and
- a polarizing beam splitter that splits and extracts the confocal reflected light and an aperture that limits the confocal reflected light in the third light detection mode.

* * * * *